UNITED STATES PATENT OFFICE.

ARMAND MÜLLER-JACOBS, OF HUNTINGTON, AND REINHARD C. F. A. C. BERNHARDI, OF NEW YORK, N. Y., ASSIGNORS TO THE ARABOL MANUFACTURING COMPANY, OF NEW YORK, N. Y., A CORPORATION OF NEW YORK.

PROCESS FOR EMULSIFYING OILS, FATS, AND THE LIKE.

975,447. Specification of Letters Patent. Patented Nov. 15, 1910.

No Drawing. Application filed June 7, 1909. Serial No. 500,539.

*To all whom it may concern:*

Be it known that we, ARMAND MÜLLER-JACOBS and REINHARD C. F. A. C. BERNHARDI, respectively citizens of the Swiss Republic and German Empire, and respectively residents of Huntington, Long Island, in the county of Suffolk and State of New York, and of the city of New York, county and State of New York, have invented certain new and useful Improvements in Processes for Emulsifying Oils, Fats, and the Like, of which the following is a specification.

The invention relates to emulsifying processes, and particularly to a process for producing stable, neutral and homogeneous emulsions of oils, fats, and the like, without altering the character of the latter. It is based on the action of certain aldehydes on plant slimes, such as are derived from *Algæ*, roots, herbs, seeds, and slime or gum producing shrubs and trees, as well as on their compounds with basic radicals, preferably containing nitrogen, such as their ammonium salts or their amids. The aldehydes in this connection have been found to have certain fixing qualities, and so prevent the oil from separating on standing.

By the process herein set forth, absolutely stable and neutral emulsions are formed with a minimum of emulsifying medium. Plant slimes or their compounds, unsupported by aldehydes, have been tried for emulsifying oils and the like, but such emulsions do not last and the oil will separate in time. We are also aware that numerous other reagents have been employed in the emulsifying of oils, fats, etc., and that such attempts have been partly successful, but produce an alkaline or an acid emulsion, or one which is not absolutely stable. Such emulsions also, as a rule, have the drawback that they will not last unless a relatively large proportion of the emulsifying agent is used; whereas with our process, on the average, only 20% (calculated on the substance which is to be emulsified) is required.

In our process we employ as the emulsifying agent preferably the slime derived from plants, such for example as from *Algæ* and the sea tangs as the "*Laminaria digitata*" and "*Laminaria saccharina*" and the like, and preferably their ammonia compounds. To this is added a small amount of an aldehyde, preferably commercial 40% formaldehyde, which insures the stability of the emulsion, and at the same time increases the emulsifying power of the plant slime. The formaldehyde apparently disappears completely as such.

In carrying out the process we first prepare the emulsifier by swelling one part of dry plant slime, or its compounds with basic radicals such as the ammonium tangate $C_{13}H_{16}O_{14}(NH_4)_4$ which is derived from the sea tang "*Laminaria digitata*," in nine parts of water; and then adding from one to two per cent. of a suitable aldehyde, such as formaldehyde. To this prepared emulsifier, and preferably soon after preparing the same, the oil, fat, hydro-carbon or other substance to be emulsified is slowly added with constant stirring, and at the proper temperature, depending upon the character of the material to be emulsified.

As an example of the emulsification of a lighter oil, we take—kerosene 50 parts, prepared emulsifier 50 parts. In the case of heavy cylinder oil the following proportions will produce satisfactory results: Cylinder oil $33\frac{1}{3}$ parts, prepared emulsifier $66\frac{2}{3}$ parts. With a more solid material, such as ordinary paraffin, the following proportions will be suitable: Paraffin, when at a melting point of say 42° C. 20 parts, prepared emulsifier 80 parts.

Now, when an alcohol and water are mixed there is a certain proportion which yields a maximum of heat and a maximum contraction in volume. We have discovered that our emulsions follow the same law, and that the highest degree of stability corresponds with the highest development of contraction and heat.

Emulsions produced by our process are perfectly stable, and absolutely neutral; and it is possible to hereby include a much greater proportion of the emulsified material than is obtained by other processes, and the emulsion is practically free from deleterious salts. The emulsion can be diluted to a considerable degree without decomposing; and it has been found possible to dilute one part of such emulsions with 50 to 100 parts of water. Apparent separations are still emulsions and will readily again mix upon shaking. Numerous applications of the products thus obtained readily suggest themselves, for example: they may be employed as a softener and finish for textiles, as spinning or wool oils, as bore oils, as fat liquors for leather, for therapeutic purposes, as insecticides, and as lubricants for machinery.

We claim:—

1. The herein described process of producing stable and neutral emulsions of oils, fats, and the like, which consists in intimately mixing the same with a suitable plant slime swelled in the desired quantity of water to which has been added the desired quantity of a suitable aldehyde.

2. The herein described process of producing stable and neutral emulsions of oils, fats, and the like, which consists in intimately mixing the same with the slime derived from sea tang swelled in the desired quantity of water to which has been added the desired quantity of a suitable aldehyde.

3. The herein described process of producing stable and neutral emulsions of oils, fats, and the like, which consists in intimately mixing the same with the slime derived from "*Laminaria digitata*" swelled in the desired quantity of water to which has been added the desired quantity of formaldehyde.

4. The herein described process of producing stable and neutral emulsions of oils, fats, and the like, which consists in intimately mixing the same with a prepared emulsifier composed of plant slime, water, and formaldehyde.

5. The herein described process of producing stable and neutral emulsions of oils, fats, and the like, which consists in intimately mixing the same with a prepared emulsifier composed of plant slime, water, and 1 to 2% of formaldehyde.

6. The herein described process of producing stable and neutral emulsions of oils, fats, and the like, which consists in intimately mixing the same with a prepared emulsifier composed of a compound of plant slime with a suitable basic radical, water, and formaldehyde.

7. The herein described process of producing stable and neutral emulsions of oils, fats, and the like, which consists in intimately mixing the same with a prepared emulsifier composed of a compound of plant slime with a suitable basic radical containing nitrogen, water, and formaldehyde.

8. The herein described process of producing stable and neutral emulsions of oils, fats, and the like, which consists in intimately mixing the same with a prepared emulsifier composed of a compound of plant slime with ammonia, water, and formaldehyde.

9. The herein described process of producing stable and neutral emulsions of oils, fats, and the like, which consists in intimately mixing the same with a prepared emulsifier composed of ammónium tangate, water, and formaldehyde.

10. The herein described process of producing a stable and neutral emulsion of cylinder oil, which consists in intimately mixing $33\frac{1}{3}$ parts of the same with $66\frac{2}{3}$ parts of a prepared emulsifier composed of plant slime, water, and formaldehyde.

11. The herein described process of producing a stable and neutral emulsion of cylinder oil, which consists in intimately mixing $33\frac{1}{3}$ parts of the same with $66\frac{2}{3}$ parts of a prepared emulsifier composed of ammonium tangate 6.6 parts, water 59 parts, and formaldehyde one part.

12. An emulsifying preparation composed of a compound of plant slime with a basic radical, water, and formaldehyde, in the proper proportions.

13. An emulsifying preparation composed of ammonium tangate one part, water nine parts, and one to two per cent. of formaldehyde.

14. An emulsion composed of an oil, fat, or the like, plant slime, water, and a suitable aldehyde.

15. An emulsion composed of an oil, fat, or the like, plant slime, water, and formaldehyde.

16. An emulsion composed of an oil, fat, or the like, a compound of plant slime with a basic radical, water, and formaldehyde.

17. An emulsion composed of an oil, fat or the like, an ammonia compound of plant slime, water, and formaldehyde.

18. An emulsion composed of an oil, fat, or the like, ammonium tangate, water, and formaldehyde.

19. An emulsion composed of cylinder oil, ammonium tangate, water and formaldehyde.

Signed at Huntington, Long Island, in the county of Suffolk and State of New York this 5th day of June 1909.

ARMAND MÜLLER-JACOBS.
REINHARD C. F. A. C. BERNHARDI.

Witnesses:
G. L. ECKERT,
LOUIS ROSÉE.